US008780729B2

(12) United States Patent
Dalsgaard

(10) Patent No.: US 8,780,729 B2
(45) Date of Patent: Jul. 15, 2014

(54) MONITORING PATTERN SEPARATION BETWEEN COMPONENT CARRIERS BASED ON USER EQUIPMENT RF LAYOUT

(75) Inventor: Lars Dalsgaard, Oulu (FI)

(73) Assignee: Nokia Corporation, Espoo (FI)

( * ) Notice: Subject to any disclaimer, the term of this patent is extended or adjusted under 35 U.S.C. 154(b) by 238 days.

(21) Appl. No.: 13/068,134

(22) Filed: May 3, 2011

(65) Prior Publication Data

US 2011/0267955 A1 Nov. 3, 2011

Related U.S. Application Data

(60) Provisional application No. 61/330,621, filed on May 3, 2010.

(51) Int. Cl.
| | |
|---|---|
| *H04L 1/00* | (2006.01) |
| *H04W 24/00* | (2009.01) |
| *H04W 28/18* | (2009.01) |
| *H04W 24/10* | (2009.01) |

(52) U.S. Cl.
CPC ............. *H04W 24/00* (2013.01); *H04W 28/18* (2013.01); *H04W 24/10* (2013.01)
USPC ........... 370/241; 370/280; 370/355; 370/342; 370/476; 455/68; 455/452.1; 714/749; 714/776

(58) Field of Classification Search
USPC ......... 370/241, 280, 329, 335, 338, 342, 437, 370/476; 455/68, 452.1; 714/749, 776
See application file for complete search history.

(56) References Cited

U.S. PATENT DOCUMENTS

| | | | | |
|---|---|---|---|---|
| 7,515,939 | B2 * | 4/2009 | Catreux-Erceg et al. | .. 455/562.1 |
| 7,535,969 | B2 * | 5/2009 | Catreux et al. | ................ 375/267 |
| 8,194,603 | B2 * | 6/2012 | Nimbalker et al. | ........... 370/329 |

(Continued)

FOREIGN PATENT DOCUMENTS

WO   WO 2009/120124 A1   10/2009

OTHER PUBLICATIONS

"Stage 2 description of Carrier Aggregation", Nokia Siemens Networks, 3GPP TSG-RAN WG2 Meeting #69, R2-102645, Apr. 2010, 18 pgs.

(Continued)

*Primary Examiner* — Andrew Lai
*Assistant Examiner* — Andrew C Lee
(74) *Attorney, Agent, or Firm* — Harrington & Smith

(57) ABSTRACT

A network learns capability information indicating whether a user equipment (UE) is capable of simultaneous and independent operation in multiple component carriers (CCs). The network configures a monitoring pattern for each of multiple CCs that are configured for the UE in dependence on the received capability information. The capability information derives from the UE's RF layout; if the UE is capable of such simultaneous and independent operation the network can assign for the CCs different monitoring patterns that are independent of one another and the UE will have no gaps where it cannot take or send a measurement. This knowledge is particularly useful if the CCs are frequency non-contiguous with one another. If the UE is not so capable, the network must assign monitoring patterns to that UE for all its configured CCs that are not independent of one another.

17 Claims, 5 Drawing Sheets

(56) References Cited

U.S. PATENT DOCUMENTS

| | | | |
|---|---|---|---|
| 8,265,080 B2 * | 9/2012 | Cai et al. | 370/395.2 |
| 2006/0013182 A1 * | 1/2006 | Balasubramanian et al. | 370/343 |
| 2010/0085901 A1 * | 4/2010 | Womack et al. | 370/278 |
| 2010/0172428 A1 * | 7/2010 | Pani et al. | 375/262 |
| 2010/0215011 A1 * | 8/2010 | Pan et al. | 370/329 |
| 2010/0227569 A1 * | 9/2010 | Bala et al. | 455/73 |
| 2010/0234037 A1 * | 9/2010 | Terry et al. | 455/450 |
| 2010/0234040 A1 * | 9/2010 | Palanki et al. | 455/452.2 |
| 2010/0260130 A1 * | 10/2010 | Earnshaw et al. | 370/329 |
| 2010/0272048 A1 * | 10/2010 | Pan et al. | 370/329 |
| 2010/0296467 A1 * | 11/2010 | Pelletier et al. | 370/329 |
| 2010/0303039 A1 * | 12/2010 | Zhang et al. | 370/331 |
| 2011/0002281 A1 * | 1/2011 | Terry et al. | 370/329 |
| 2011/0021154 A1 * | 1/2011 | Marinier et al. | 455/67.11 |
| 2011/0034175 A1 * | 2/2011 | Fong et al. | 455/450 |
| 2011/0044239 A1 * | 2/2011 | Cai et al. | 370/328 |
| 2011/0081934 A1 * | 4/2011 | Imamura et al. | 455/522 |
| 2011/0170496 A1 * | 7/2011 | Fong et al. | 370/329 |
| 2011/0205976 A1 * | 8/2011 | Roessel et al. | 370/329 |

OTHER PUBLICATIONS

"LTE-Advanced (3GPP Release 10 and beyond)-RF aspects", Nakamura, Takaharu/ Fujitsu Limited, 3GPP 2009 Workshop for Evaluation, Dec. 17-18, 2009, 22 pgs.

"DRX in Carrier Aggregation—Active Time", Nokia Siemens Networks, 3GPP TSG-RAN WG2 Meeting #69, R2-101527, Feb. 2010, 4 pgs.

"Timing and HARQ Feedback Errors with Activation/Deactivation", Nokia Siemens Networks, 3GPP TSG-RAN WG2 Meeting #69bis, R2-101986, Apr. 2010, 4 pgs.

"Impact of retransmissions on common DRX performance", Ericsson, 3GPP TSG-RAN WG2 #69bis, R2-102040, Apr. 2010, 6 pgs.

"UE RF model and capability", RAN2, 3GPP TSG-RAN WG2 meeting #69bis, R2-102664, Apr. 2010, 2 pgs.

"3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)", 3GPP TS 36.300 V9.3.0, Mar. 2010, 166 pgs.

* cited by examiner

| | | ON-DURATION AND INACTIVITY TIMER ACTIVE | ON-DURATION=5TTI |
|---|---|---|---|
| | | SCHEDULING | INACTIVITY TIMER=5TTI |
| | | MEASUREMENTS (RSRP)/RF PART ACTIVE | |

| SFN | | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 |
|---|---|---|---|---|---|---|---|---|---|---|---|---|---|---|---|---|---|---|---|---|---|---|---|---|---|---|---|---|---|---|---|---|---|---|---|---|---|---|---|
| ON-DURATION | | 0 | 1 | 2 | 3 | 4 | | | | | | | | | | | | | | | | | | | | | | | | | | | | | | | | | | |
| PCC ACT/DE-ACT | | A | A | A | A | A | A | A | A | A | A | A | A | A | A | A | A | A | A | A | A | A | A | A | A | A | A | A | A | A | A | A | A | A | A | A | A | A | A |
| | USAGE | | T | | | | | | | | | | | | | | | | | | | | | | | | | | | | | | | | | | | | | |
| | INACTIVITY TIMER | | | 0 | 1 | 2 | 3 | 4 | 0 | 1 | 2 | 3 | 4 | | | | | | | | | | | | | | | | | | | | | | | | | | | |
| | ACTIVE TIME | a | a | a | a | a | a | a | a | a | a | a | a | | | | | | | | | | | | | | | | | | | | | | | | | | | |
| | ACK/NAK | | | a | | | | | a | | | | | | | | | | | | | | | | | | | | | | | | | | | | | | | |
| | RX ON | | | | | | | | | | | | | | | | | | | | | | | | | | | | | | | | | | | | | | | |
| SCC1 ACT/DE-ACT | | D | D | D | D | D | D | D | D | D | D | D | D | D | D | D | D | D | D | D | D | D | D | D | D | D | D | D | D | D | D | D | D | D | D | D | D | D | D |
| | USAGE | | | | | | | | | | | | | | | | | | | | | | | | | | | | | | | | | | | | | | | |
| | INACTIVITY TIMER | | | | | | | | | | | | | | | | | | | | | | | | | | | | | | | | | | | | | | | |
| | ACTIVE TIME | | | | | | | | | | | | | | | | | | | | | | | | | | | | | | | | | | | | | | | |
| | ACK/NAK | | | | | | | | | | | | | | | | | | | | | | | | | | | | | | | | | | | | | | | |
| | RX ON | | | | | | | | | | | | | | | | | | | | | | | | | | | | | | | | | | | | | | | |
| SCC2 ACT/DE-ACT | | D | D | D | D | D | D | D | D | D | D | D | D | D | D | D | D | D | D | D | D | D | D | D | D | D | D | D | D | D | D | D | D | D | D | D | D | D | D |
| | USAGE | | | | | | | | | | | | | | | | | | | | | | | | | | | | | | | | | | | | | | | |
| | INACTIVITY TIMER | | | | | | | | | | | | | | | | | | | | | | | | | | | | | | | | | | | | | | | |
| | ACTIVE TIME | | | | | | | | | | | | | | | | | | | | | | | | | | | | | | | | | | | | | | | |
| | ACK/NAK | | | | | | | | | | | | | | | | | | | | | | | | | | | | | | | | | | | | | | | |
| | RX ON | | | | | | | | | | | | | | | | | | | | | | | | | | | | | | | | | | | | | | | |
| SCC3 ACT/DE-ACT | | A | A | A | A | A | A | A | A | A | A | A | A | A | A | A | A | A | A | A | A | A | A | A | A | A | A | A | A | A | A | A | A | A | A | A | A | A | A |
| | USAGE | | | | | | | | | | | | | | | | | | | | | | | | | | | | | | | | | | | | | | | |
| | INACTIVITY TIMER | | | | | | | | | | | | | | | | | | | | | | | | | | | | | | | | | | | | | | | |
| | ACTIVE TIME | a | a | a | a | a | | | | | | | | | | | | | | | | | | | | | | | | | | | | | | | | | | |
| | ACK/NAK | | | | | | | | | | | | | | | | | | | | | | | | | | | | | | | | | | | | | | | |
| | RX ON | | | | | | | | | | | | | | | | | | | | | | | | | | | | | | | | | | | | | | | |
| SCC4 ACT/DE-ACT | | D | D | D | D | D | D | D | D | D | D | D | D | D | D | D | D | D | D | D | D | D | D | D | D | D | D | D | D | D | D | D | D | D | D | D | D | D | D |
| | USAGE | | | | | | | | | | | | | | | | | | | | | | | | | | | | | | | | | | | | | | | |
| | INACTIVITY TIMER | | | | | | | | | | | | | | | | | | | | | | | | | | | | | | | | | | | | | | | |
| | ACTIVE TIME | | | | | | | | | | | | | | | | | | | | | | | | | | | | | | | | | | | | | | | |
| | ACK/NAK | | | | | | | | | | | | | | | | | | | | | | | | | | | | | | | | | | | | | | | |
| | RX ON | | | | | | | | | | | | | | | | | | | | | | | | | | | | | | | | | | | | | | | |

FIG.4A

| FIG.4A | FIG.4B | FIG.4

MONITORING PATTERN SEPARATION BETWEEN COMPONENT CARRIERS BASED ON USER EQUIPMENT RF LAYOUT

CROSS REFERENCE TO RELATED APPLICATION

This application claims priority under 35 USC 119(e) of U.S. provisional patent application Ser. No. 61/330,621, filed on May 3, 2010. The subject matter of that provisional application is hereby incorporated by reference.

TECHNICAL FIELD

The exemplary and non-limiting embodiments of this invention relate generally to wireless communication systems, methods, devices and computer programs and, more specifically, relate to discontinuous reception or other monitoring patterns for user equipments operating in a system that employs carrier aggregation.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:
3GPP third generation partnership project
BB baseband
BW bandwidth
CA carrier aggregation
CC component carrier
CQI channel quality indicator
DL downlink (eNB to UE direction)
DRX discontinuous reception
eNB EUTRAN Node B (evolved Node B/base station)
E-UTRAN evolved UTRAN (LTE)
HARQ hybrid Automatic retransmission request
LTE long term evolution
LTE-A LTE-advanced
MAC medium access control
PCC primary CC
PDCCH physical downlink control channel
PDSCH physical downlink shared channel
PUSCH physical uplink shared channel
RF radio frequency
RRC radio resource control
RSRP reference signal received power
RSRQ reference signal received quality
SCC secondary CC
UE user equipment
UL uplink (UE to eNB direction)
UTRAN universal terrestrial radio access network In the E-UTRAN system, LTE Release 8 is completed, the LTE Release 9 is being standardized, and the LTE Release 10 is currently under development within the 3GPP. In LTE the downlink access technique is orthogonal frequency multiple division access OFDMA, and the uplink access technique is single carrier, frequency division multiple access SC-FDMA. These access techniques are expected to continue in LTE Release 10.

FIG. 1 shows the overall architecture of the E-UTRAN system. The EUTRAN system includes eNBs, providing the EUTRA user plane and control plane (RRC) protocol terminations towards the UE. The eNBs are interconnected with each other by means of an X2 interface. The eNBs are also connected by means of an S1 interface to an evolved packet core, more specifically to a MME and to a Serving Gateway. The S1 interface supports a many to many relationship between mobility management entities MMEs/Serving Gateways and the eNBs.

In LTE Release 8/9 there are discontinuous reception DRX periods during which a mobile terminal/UE is allowed to power down (sleep or idle mode) to conserve power and the network knows not to send transmissions to it. Other active periods are synchronized to this DRX period. For example FIG. 2 gives a general overview of the DRX concept in E-UTRAN for a single mobile terminal. The PDCCH gives resource allocations to multiple mobile terminals for resources in the UL and DL shared channels, shown as PDSCH and PUSCH. More than one consecutive PDCCH may be used (the duty cycle or 'on-duration'), but the overall schedule repeats after each DRX.

The UEs synchronize to the PDSCH and aligns to the RRC-Connected/idle mode DRX of the eNB in order to receive possible resource allocations/paging messages from network. One of the parameters needed in RRC-Connected/idle mode terminal is the RRC-Connected/idle mode DRX period so that the UE and eNB have synchronized resource allocation/paging occasions defined by the DRX schedule during which the eNB can send resource allocations or a page to the UE, which tunes to listen at those times.

Though described in view of LTE or E-UTRAN, many current wireless systems use the DRX concept and can benefit from these teachings, as will future systems that employ discontinuous reception at the mobile equipment. For example, the GERAN system uses a paging period (see for example 3GPP TS 45.002) and legacy UTRAN (3G) uses paging and idle mode DRX and continuous packet connectivity (CPC) in the connected mode (see for example 3GPP TS 25.331 and TS 25.304).

LTE-A will likely be part of LTE Release 10 which is to include bandwidth extensions beyond 20 MHz, among other changes. This bandwidth extension is to be done via carrier aggregation (CA), in which several component carriers (at least one of which is Release 8 compatible) are aggregated together to form a system bandwidth. This is shown by example at FIG. 3 in which there are five CCs aggregated to form one larger LTE-A bandwidth of 100 MHz. Future LTE-A terminals could potentially receive/transmit on multiple CCs at the same time to give the eNB greater scheduling flexibility while increasing data throughput.

In LTE-Advanced, multiple DL and/or UL CCs may be configured/activated for one UE. There are two levels of handling CCs: the UE may be configured with basic CC information via RRC signaling, and following configuration the different CCs can be activated and deactivated using MAC level signaling. MAC level signaling (activation and deactivation of CCs) was introduced in order to enable potential UE power savings.

An activated CC is one for which the UE is required to monitor the PDCCH for potential allocations, as well as perform CQI measurements and other procedures set forth in LTE Release 8. The UE does not need to monitor the PDCCH of a deactivated or inactive CC, nor is it required to perform CQI measurements on such a deactivated CC. It follows that in order that the UE to conserve power from having a CC-activation and CC-deactivation command, the UE measurement performance requirements for deactivated CCs has to be different than those that apply for activated CCs. By example, such a CC-activation or deactivation command can be at the MAC level or the RRC level, or possibly at the L1 level in certain embodiments.

As currently set forth at 3GPP TS 36.300 (v9.3.0) sec 12.1 "Carrier Aggregation" (as changed by CR document R2-102645, 3GPP TSG-RAN WG2 Meeting #69, Beijing, China; 12-16 Apr. 2010), if a UE is configured with more than one CC the same DRX operation applies to all configured and activated CCs, so there is identical active time for PDCCH monitoring. The PCC is from a primary cell and is always active; all other configured CCs are termed SCCs which may be from a secondary cell and at any given time any of those SCCs may be active or inactive for the UE for which they are configured. CR document R2-102645 is attached as Appendix A to the priority document U.S. 61/330,621.

A problem arises when the status of a configured CC is changed, for example from deactivated to activated (and also vice versa). The UE needs to tune from the first CC (PCC or some other CC which has remained active) to the newly activated second CC in order to monitor the PDCCH, measure it and report on that second CC. An additional problem occurs when measurements have to be performed on an intra-band deactivated CC (that is, contiguous in frequency with the other CC which remains active) in that still the UE needs to re-tune its radio to the frequency of the other contiguous-band CC. During the time the UE is tuned or needs to re-tune its receiver to receive and measure the other CC, there is a gap during which the UE's DRX pattern for a first CC causes the network to expect that the UE is actively listening to that first CC when in fact the UE is re-tuning in order to measure the other CC.

Embodiments of this invention are directed to how DRX and/or measurement reporting is applied on CC's of a CA system that are actively used by the UE. Currently for LTE-A it is assumed that the DRX cycle will be common to all CCs. At International publication WO/2009/120124, entitled "DRX FUNCTIONALITY IN MULTI-CARRIER WIRELESS NETWORKS", when there is a gap such as might arise from using a common DRX across multiple CCs, the network sends override commands to disable or to modify the DRX cycles of certain CCs, which this publication appears to characterize as providing independent DRX on the respective CCs.

SUMMARY

In a first aspect thereof the exemplary embodiments of the invention provide an apparatus comprising: at least one processor at least one memory storing computer program code. In this embodiment the at least one processor is configured with the memory and computer program code to cause the apparatus to at least: receive capability information of a user equipment indicating whether the user equipment is capable of simultaneous and independent operation in multiple component carriers; and configure a monitoring pattern for each of multiple component carriers that are configured for the user equipment in dependence on the received capability information.

In a second aspect thereof the exemplary embodiments of the invention provide a method comprising: receiving capability information of a user equipment indicating whether the user equipment is capable of simultaneous and independent operation in multiple component carriers; and configuring a monitoring pattern for each of multiple component carriers that are configured for the user equipment in dependence on the received capability information.

In a third aspect thereof the exemplary embodiments of the invention provide a memory storing computer program instructions. In this aspect, when the computer program instructions are executed the resulting operations comprise: receiving capability information of a user equipment indicating whether the user equipment is capable of simultaneous and independent operation in multiple component carriers; and configuring a monitoring pattern for each of multiple component carriers that are configured for the user equipment in dependence on the received capability information.

In exemplary embodiments of any of the above aspects the apparatus is or the method/operations are performed by a network access node and the capability information of the user equipment is received from the user equipment. In other exemplary embodiments of any of the above aspects the apparatus is or the method/operations are performed by a first network access node and the capability information of the user equipment is received from a second network access node from which the user equipment is handed over to the first network access node.

In exemplary embodiments of any of the above aspects the capability information depends on a RF layout of the user equipment.

In a particular embodiment for any of the above aspects, for the case the received capability information indicates that the user equipment is capable of simultaneous but not independent operation in multiple component carriers, then configuring the monitoring pattern for each of the multiple component carriers that are configured for the user equipment comprises assigning to the user equipment one monitoring pattern for use across every one of the multiple component carriers configured for the user equipment.

In a different particular embodiment for any of the above aspects, for the case the received capability information indicates that the user equipment is capable of simultaneous and independent operation in multiple component carriers, then configuring the monitoring pattern for each of the multiple component carriers configured for the user equipment comprises: a) assigning to the user equipment a first monitoring pattern for use in a first component carrier of the multiple component carriers that are configured for the user equipment; and b) assigning to the user equipment a second monitoring pattern for use in a second component carrier of the multiple component carriers that are configured for the user equipment. In this different particular embodiment the network may choose to make the first and second monitoring patterns independent of one another. In other embodiments the patterns may differ though not be independent of one another (e.g., offset from one another by a constant amount, multiples of one another, etc.) even if the UE is not capable of independent operation across the CCs. And in a most particular embodiment monitoring patterns are made independent of one another when the first and second component carriers are frequency non-contiguous with one another. The latter is particularly valuable where the independent monitoring patterns are discontinuous reception patterns. Where the first and second component carriers are frequency contiguous, advantages are also realized where the independent monitoring patterns are measurement cycles (e.g., RSRP or RSRQ measurement cycles, or resource allocation schedule/PDCCH reception cycles).

In certain embodiments the UE also performs mirror image operations; sending its capability information and being configured by a network with a monitoring pattern for each of multiple component carriers that are configured for the user equipment.

These and other aspects and embodiments are detailed below with particularity.

DETAILED DESCRIPTION

Figure 3:
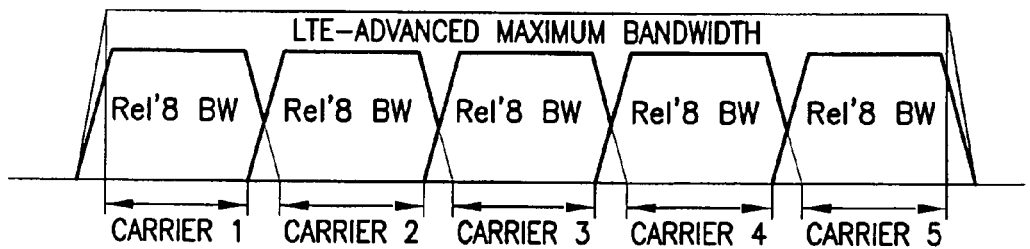
FIG. 3 is a schematic diagram of a radio spectrum characterized by carrier aggregation, in which five component carrier bandwidths are aggregated into a single LTE-A bandwidth.

The examples below are in the context of a LTE-A system but may be employed with any CA type wireless communication system. FIG. 3 is specific to one LTE-A implementation of CA but is presented to show the general concept of CA; smaller frequency chunks such as for example 1.4 MHz, 5 MHz and 10 MHz CCs can be aggregated, and the total CA bandwidth can be less than or greater than 100 MHz. Some CA systems or embodiments may have non-contiguous CCs (for example the spectrum blocks forming the CCs might be far apart in terms of frequency such as 700 MHz and 2.1 GHz). Other CA systems or embodiments may have an asymmetric DL/UL CA which for example may be built into a CA system by combining a frequency division duplex FDD component carrier with a time division duplex TDD component carrier. LTE-A/Release 10 is used in the description below to explain the invention using specific examples, but the concepts presented below are not limited only to the LTE-A/Release 10 system. While the examples below are in the context of a DRX cycle or DRX period, they are but non-limiting specific examples. These teachings may be used for monitoring patterns in general, such as for example patterns/cycles for a UE to measure RSRP or RSRQ on its multiple component carriers, or patterns/cycles by which a UE is to monitor its multiple component carriers for a resource allocation schedule/PDCCH.

Consider again the example scenario of the background section in which a CC status is changed from deactivated to activated. For the case in which the UE has multiple radio-frequency components in parallel such that it can tune to the different CCs simultaneously and perform its measurement or listen to the relevant PDCCHs independent of the UE's measurement or listening on another CC and so without diminishing its activity on any other CC, the UE will not miss any PDCCH which the network chooses to send on any CC that is active for that UE and there is no listening or measurement gap. The DRX periods can be made independent of one another for that UE on its various active CCs.

For the case in which the UE does not have such a parallel RF capability across all of its active CCs (its capability may be simultaneous but not independent across the CCs), the RF activity for that UE can be tuned separately, when feasible, to assure the UE can experience some power savings. The RF components are often those which consume the most power when active, as compared to other UE components such as baseband processing. So if the network could know the relevant RF capabilities of a particular UE (relevant being for simultaneous and independent reception and/or transmission on different CCs) the network can avoid any gaps in measurement and PDCCH coverage by the UE by tailoring the DRX periods it assigns to the particular UE on the UE's RF capabilities.

To implement this, in accordance with an exemplary embodiment of the invention the UE's DRX behavior and measurement performance and PDCCH monitoring rules on configured CC are dependent on the UE RF layout. Such a RF layout in one embodiment may be limited only to hardware components such as radio receivers and associated filters, but other exemplary embodiments include in the RF layout certain software considerations such as processor capacity to process the different streams from the various active CCs at the same time. The examples below focus on the hardware aspects of the RF layout but it is known in the art to consider processing capacity when assessing capability of an electronic device for simultaneous tasks and so the below examples are explanatory and not limiting to the broader aspects of the invention.

Consider a non-limiting example for two UEs with different RF layouts. A first UE has two configured CCs which are handled by the same RF parts of that first UE. In this case the DRX pattern on both CCs is selected by the network/eNB to follow the strictest DRX pattern: if one CC is activated and the other is not activated the DRX pattern (and thereby the PDCCH monitoring rules) on both CCs will follow the DRX pattern and rules given for the activated CC. In this case the DRX patterns are not independent of one another. A second UE is configured with two CCs but this second UE handles each CC by a distinct RF chain. In this case the DRX pattern on each CC can be independent of the other, and the network does not need to de-activate one CC in order for the UE to follow the DRX pattern or rules on the activated CC.

In the first example case above, the same DRX parameters are applied by the UE to achieve the same DRX pattern on both CCs. In the second example case above the two DRX patterns are independent of one another. This is not to imply that for the second case the DRX parameters themselves must be different across the two CCs. In the first example the network and the UE are constrained such that the same DRX pattern is used for both CCs, and in the second example there is no such constraint. In a specific implementation of the second example it may be that the DRX parameters are the same for all CCs that are configured for a UE. How those DRX parameters are applied, which in the end determines how the UE monitors the PDCCH, is different in the above two examples based on whether the UE must use the same RF chain to monitor the two example CCs. In the first example the UE must use the same RF chain to monitor both the activated CC and the deactivated CC and so both will exhibit the same DRX pattern. In the second example the UE is able to use different RF chains to monitor those two CCs and so the network can assign a DRX pattern on the activated CC that is independent of the DRX pattern on the deactivated CC.

From the network's perspective, it configures the DRX on the two configured CCs for the first UE in dependence on the first UE's RF layout, whereas it configures the DRX on the two configured CCs for the second UE independently of the second UE's RF layout. Since in either case the network must know the RF layout, in both cases the DRX on the multiple CCs configured for either UE depends on the network's knowledge of the particular UE's RF layout. In this manner it is possible to simplify measurements on and activation/deactivation of contiguous (intra-band) CCs when handled by the same RF layout as there will be no need for measurements gaps or activation/deactivation gaps. Alternatively both UEs are configured with the same DRX but based on UE RF layout it will apply the parameters accordingly to this and may inform the network about the behavior (or this may be deduced by network from UE information given in connection with this or other signaling e.g. UE capability information).

In an exemplary embodiment the UE signals to the eNB information about the UE's RF layout. In one particular non-limiting embodiment the UE does this by indicating to the eNB at configuration time which level of measurement accuracy (performance requirements) the UE can/will provide on different CCs. In another embodiment once the UE is established in a cell, at handover of the UE the target cell gets the UE's RF layout information from the serving cell that the UE is being handed over from.

So for example if a deactivated CC is handled by the same RF chain in the UE, the UE would (at the cost of extra power consumption) perform measurements according to the performance requirements given by the DRX pattern from the activated CC. In this example since the measurements are on a deactivated CC the measurements are only RSRP/RSRP according to current understanding for LTE-A. More generally these may be referred to as limited measurements, because even though RSRP/RSRQ measurements are done on a deactivated CC according to the activated CC performance requirements it does not mean that the UE would also perform CQI measurements on the deactivated CC. The CQI measurements (as well as the radio link failure RLF calculations) are not done on a CC until that CC is activated.

Figure 4B:
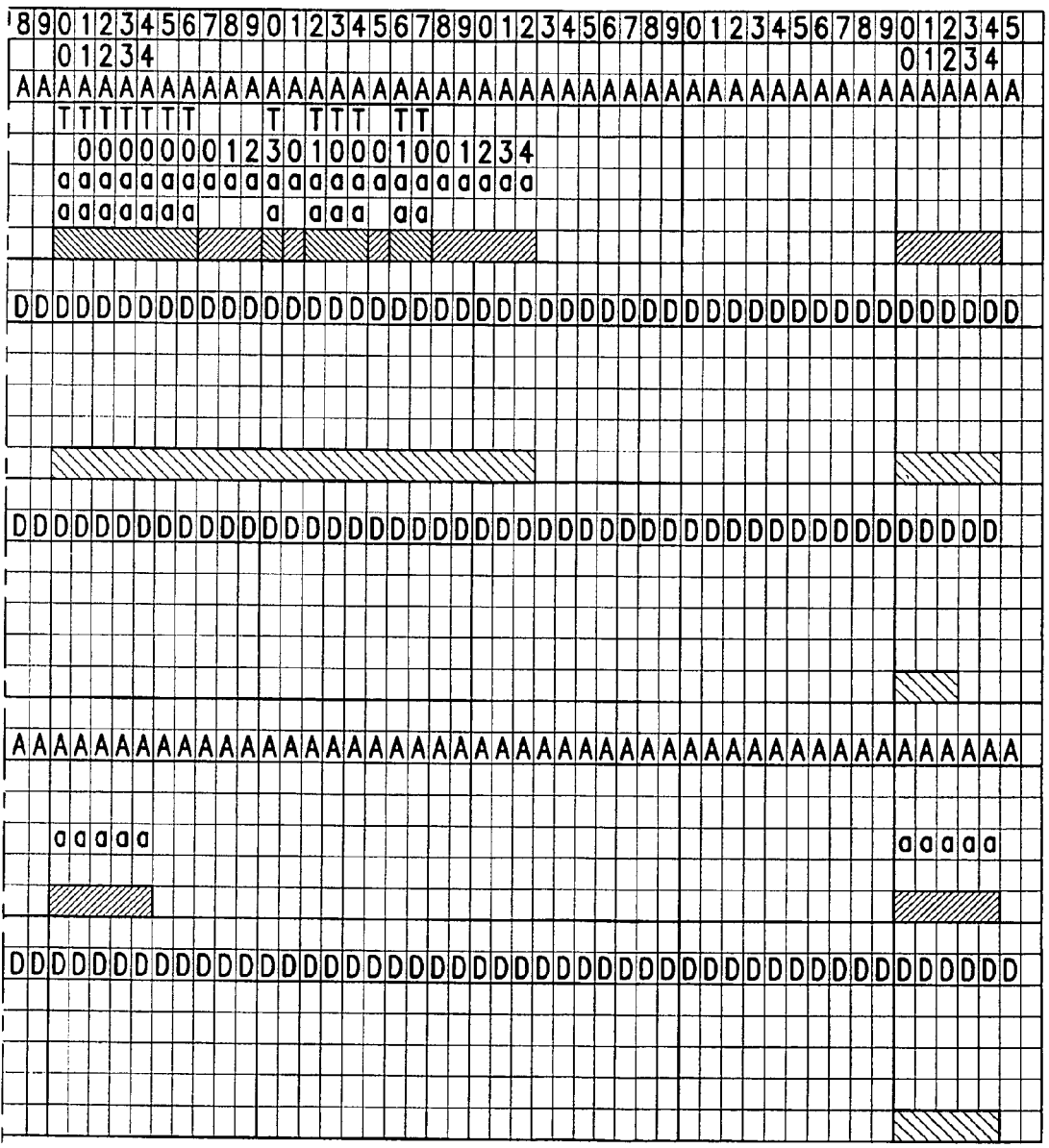
FIG. 4 Illustrates DRX patterns for a single UE across five CCs according to an exemplary embodiment of the invention.

In an exemplary embodiment for this example, in order to avoid the need for RF switching gaps, the UE will activate full RF bandwidth reception on both CCs according to the activated CC pattern. This is illustrated in FIG. 4 in which the PCC and SCC1 is activated using the DRX pattern of the PCC, which is possible because SCC1 is deactivated but handled by the same RF chain and filtering etc, in the UE. For FIG. 4, there are five CCs configured for the UE, with only the PCC and SCC3 being active in FIG. 4 as evidenced by the designator "A" at the active/de-active line. The PCC and SCC3 are each handled by their own RF chain and so the network can select the DRXs for them independently of one another. For operation in CA the UE must be capable of simultaneous operation on more than one CC, which it satisfies by the capability shown at FIG. 4 for the PCC and SCC3. But at FIG. 4 the DRX pattern for SCC2 is also independent of the DRX pattern for the PCC, meaning the UE monitors the RSRP/RSRQ on de-activated SCC2 with an RF chain independent of that used for the PCC and of SCC3. The network knows it can assign such an independent DRX on SCC2 for this UE from the capability information the UE reported earlier at configuration setup.

In an alternative embodiment no DRX is configured for the deactivated CC but the UE measurement and cell search is done independently from the DRX pattern on the active CC. In certain systems the measurement and cell search procedures and their requirements potentially depends on the DRX of the activated CC, but does not necessarily need to be as strict as the identical DRX patterns noted above. For the case in which the deactivated CC is using a separate RF chain, measurements and cell searching could be done independent of the activity on the activated CC in order to minimize potential impact on those measurements and cell searching.

Figure 1:
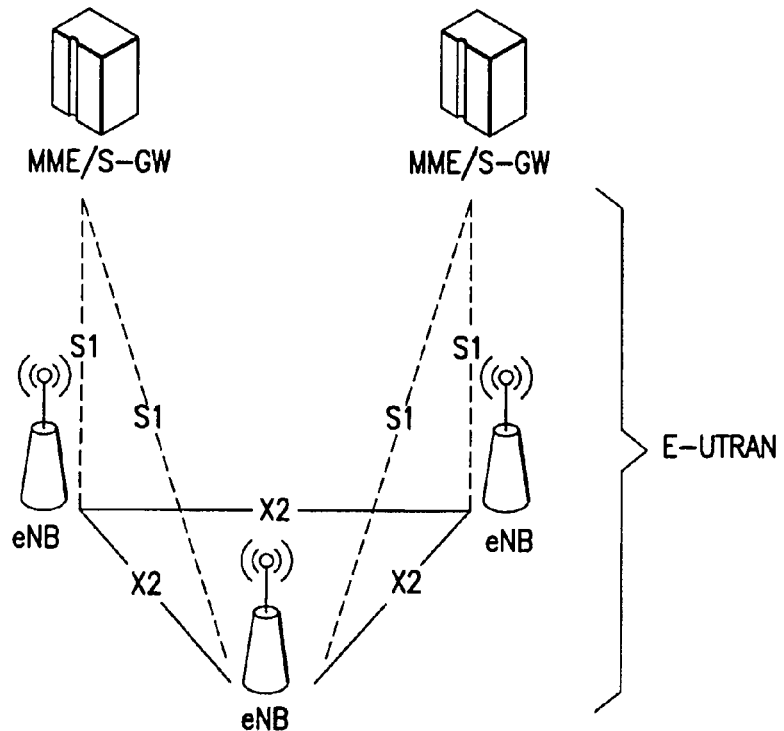
FIG. 1 is a prior art schematic diagram showing the overall architecture of the E-UTRAN system.
Figure 2:
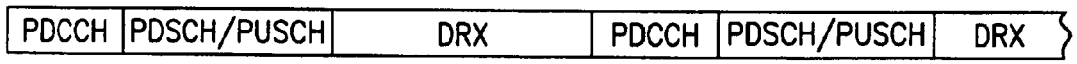
FIG. 2 is a prior art block diagram of a channel structure showing a DRX period for a single mobile terminal in E-UTRAN Release 8.

In another alternative exemplary embodiment, the rules for DRX per CC could be extended to also include a threshold level which determines when the UE should start to apply the same DRX pattern for both activated and deactivated CC. In this manner when the RSRP/RSRQ level (for example) that is measured on the deactivated SCC becomes better than the indicated threshold, it means that there is an increase to the probability that the measured de-activated SCC will soon become activated. The UE will start to apply the same monitoring rules (DRX) on the de-activated SCC once the measurement exceeds the threshold as are applied for the activated intra-band (frequency-contiguous) CC. This is illustrated in FIG. 1 among the PCC and SCC4, in which de-activated SCC4 is monitored by the same RF chain and filters as the PCC, but the measured RSRP/RSRQ of SCC4 is still below the threshold. Such a threshold could be generated by an algorithm stored in the UE or it can be signaled by the network, such as in system information or at initial configuration of the UE or anytime a CC is activated or de-activated.

Respecting the contiguous versus non-contiguous distinction, the at FIG. 3 example of five CCs show each CC being frequency-contiguous with their neighbor CCs. For the case as in FIG. 4 in which a UE is configured for all five of those CCs, then its CCs are all contiguous. For a different case in which for example the CA bandwidth consists of carriers 1, 2 and 4 of FIG. 3 and a UE were configured for all three of those CCs, then carrier 4 is not contiguous with carriers 1 and 2. So for the latter case one RF chain of the UE would be needed to monitor carriers 1 and 2 while a different RF chain would be needed to monitor carrier 4, regardless of DRX patterns. If the UE had only two separate RF chains, then the DRX pattern on carrier 2 would be made to match that on carrier 1 and the other RF chain would be used to monitor carrier 3 independently of carriers 1 or 2, but if the UE had three separate RF chains it could monitor all three of carriers 1, 2 and 4 independently.

Figure 5:
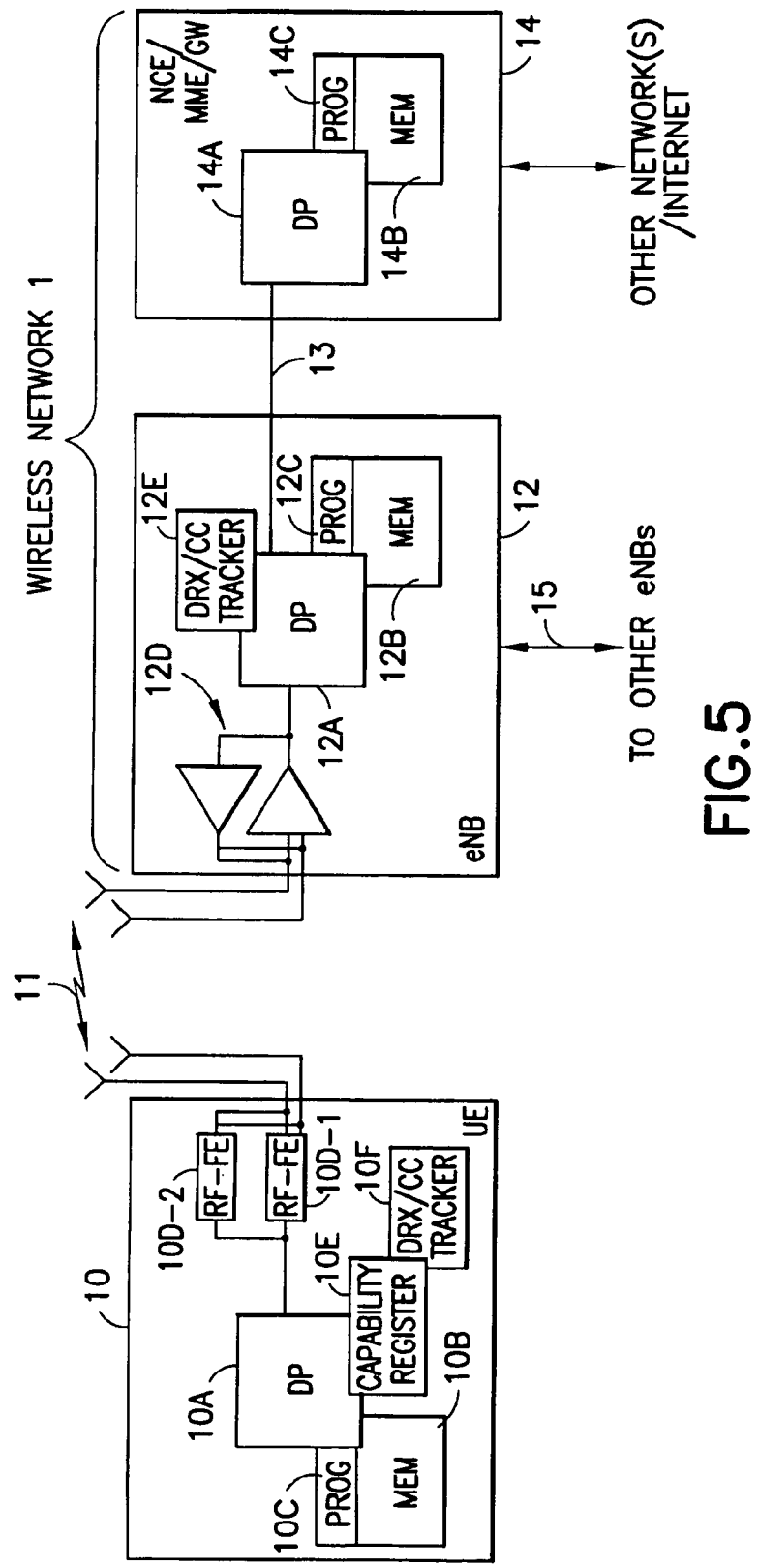
FIG. 5 is a simplified block diagram of certain apparatus for practicing certain exemplary embodiments of the invention.

FIG. 5 is a simplified block diagram of various electronic devices and apparatus that are suitable for use in practicing the exemplary embodiments of this invention. In FIG. 5 a wireless network 1 is adapted for communication over a wireless link 11 with an apparatus, such as a mobile communication device which above is referred to as a UE 10, via a network access node, such as a Node B (base station), and more specifically an eNB 12. The network 1 may include a network control element (NCE) 14 that may include the mobility entity/serving gateway MME/S-GW functionality shown in FIG. 1, and which provides connectivity with a network, such as a telephone network and/or a data communications network (e.g., the Internet).

The UE 10 includes a controller, such as a computer or a data processor (DP) 10A, a computer-readable memory medium embodied as a memory (MEM) 10B that stores a program of computer instructions (PROG) 10C, and a suitable radio frequency (RF) transceiver for bidirectional wireless communications with the eNB 12 via one or more antennas. At FIG. 5 there is shown two separate RF front ends (RF-FE) 10D-1 and 10D-2, indicating this particular UE 10 is capable of handling two independent DRXs on two different frequency bands/CCs. Of course other UEs can have different RF layouts which the UE reports to the eNB 12 as noted above. The eNB 12 also includes a controller, such as a computer or a data processor (DP) 12A, a computer-readable memory medium embodied as a memory (MEM) 12B that stores a program of computer instructions (PROG) 12C, and a suitable RF transceiver 12D for communication with the UE 10 via one or more antennas. The eNB 12 is coupled via a data/control path 13 to the NCE 14. The path 13 may be implemented as the S1 interface shown in FIG. 1A. The eNB 12 may also be coupled to another eNB via data/control path 15, which may be implemented as the X2 interface shown in FIG. 1A.

At least one of the PROGs 10C and 12C is assumed to include program instructions that, when executed by the associated DP, enable the device to operate in accordance with the exemplary embodiments of this invention. That is, the exemplary embodiments of this invention may be implemented at least in part by computer software executable by the DP 10A of the UE 10 and/or by the DP 12A of the eNB 12, or by hardware, or by a combination of software and hardware (and firmware).

For the purposes of describing the exemplary embodiments of this invention the UE 10 may be assumed to also include a capability register 10E which stores the capability information the UE reports the eNB, and the UE is also assumed to include a DRX per CC tracker 10F which tracks which DRX pattern it is to apply to each of its configured CCs. The eNB 12 is also assumed to include a DRX per CC tracker 12E which tracks similarly on a per UE basis. While these elements 10E, 10F, 12E are shown at FIG. 5 as being separate from the DPs 10A, 12A, in various implementations their function may be embodied by a stand-alone processor or chip or memory and in another implementation the function of those elements 10E, 10F, 12E is incorporated into the main processor 10A, 12A. When implemented in a memory, the MEM 10B, 12B illustrated are representative of any computer readable memory and not necessarily only one memory element; such a memory implementation may be on-chip with a processor or stand-alone with a bus connection to the relevant processor.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multicore processor architecture, as non-limiting examples.

Figure 6:
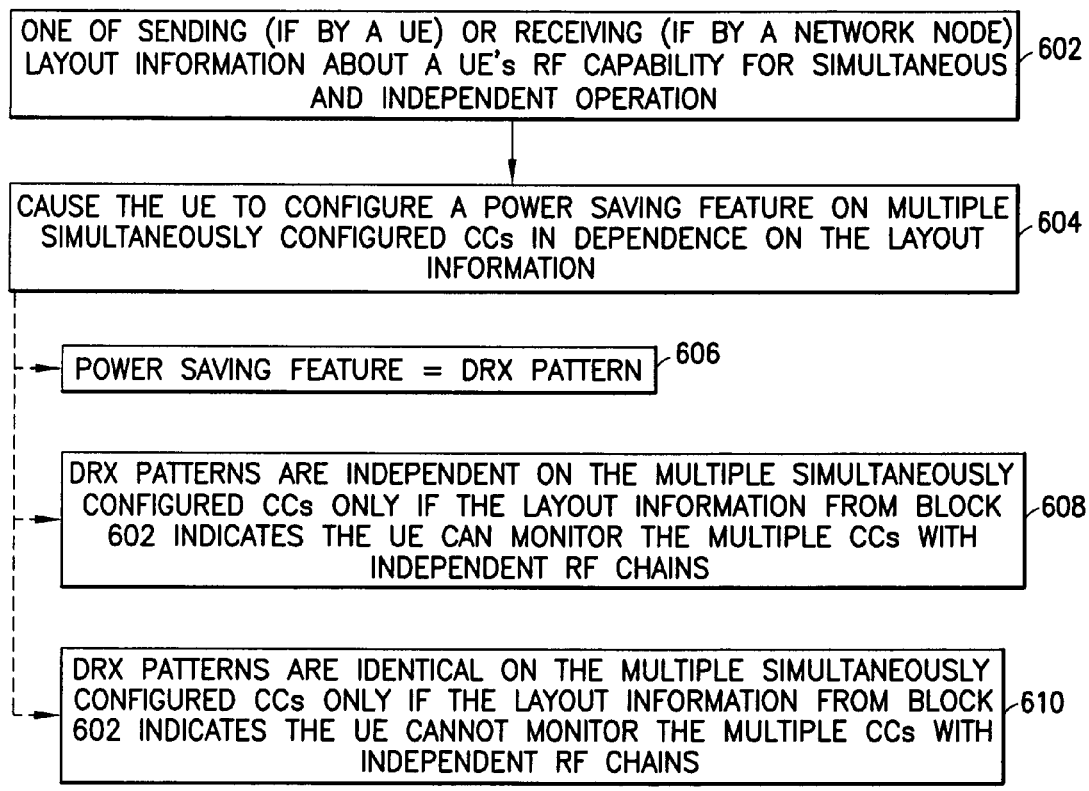
FIG. 6 is a logic flow diagram that illustrates the operation of a method, and a result of execution of computer program instructions embodied on a computer readable memory, in accordance with the exemplary embodiments of this invention.

FIG. 6 may be considered to be a logic flow diagram that illustrates the operation of a method, and the result of execution of computer program instructions, in accordance with the exemplary embodiments of this invention. Dashed lines at FIG. 6 indicate optional elements. The various blocks shown in FIG. 6 may be viewed as method steps, and/or as operations that result from operation of computer program code, and/or as a plurality of coupled logic circuit elements constructed to carry out the associated function(s). While FIG. 6 is specific to a DRX pattern, this is but one example of a monitoring pattern and it may be extended to other such monitoring patterns such as RSRP/RSRQ measuring and reporting, PDCCH monitoring, and the like.

For example, the UE and eNB, or one or more components thereof, can form an apparatus comprising at least one processor and at least one memory including computer program code, in which the at least one memory and the computer program code are configured to, with the at least one processor, cause the apparatus to perform the elements shown at FIG. 6 and/or recited in further detail above.

In accordance with the exemplary embodiments at block 602 layout information is either sent (from the perspective of the UE 10) or received (from the perspective of the eNB 12) about a UE's RF capability for simultaneous and independent operation, and at block 604 the UE is caused to configure a power saving feature on multiple simultaneously configured component carriers in dependence on the layout information. The further dashed lines at FIG. 6 indicate optional elements that are detailed above.

From the perspective of the eNB, the layout information received at block 602 may be received from the UE or from another network node from which the UE is handed over.

As detailed in the examples above, at block 606 the power saving feature noted at block 604 comprises a discontinuous reception pattern. At block 608 it is further detailed that the discontinuous reception patterns are independent on the multiple simultaneously configured CCs only if the layout information from block 602 indicates the UE can monitor the multiple CCs with independent RF chains. At block 610 it is further detailed that the discontinuous reception patterns are identical on the multiple simultaneously configured CCs only if the layout information from block 602 indicates the UE cannot monitor the multiple CCs with independent RF chains. For example, the DRX parameters may be the same for all configured CCs, but how those parameters are applied depends on the layout of the RF reported at block 602. The same DRX rules (for example, the same monitoring rules for PDCCH) are applied on CCs handled by the same RF chain for block 610 (so UE can be expected to be active on both CCs according to DRX monitoring rules of the CC with strictest requirement). Otherwise if the CCs are handled by independent RF chains as in block 608 the DRX can applied to each CC in an independent manner, and monitoring rules for example are not constrained to be the same (though they may be the same or different in particular instances).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters and channels (for example, PDCCH, PUCCH) are not intended to be limiting in any respect, as these parameters may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

I claim:

1. An apparatus comprising:
   at least one processor; and
   at least one memory storing computer program code;
   in which the at least one processor is configured with the memory and computer program code to cause the apparatus to at least:
   receive capability information of a user equipment indicating that a radio frequency layout of the user equipment is capable of at least one of simultaneous radio frequency chain operations across multiple component carriers, and independent radio frequency chain operation for each of individual ones of multiple component carriers, in which the capability information comprises an indication of the radio frequency layout of the user equipment; and
   based on the received capability information, configure at least a discontinuous reception monitoring pattern for each of the multiple component carriers that are configured for the user equipment.

2. The apparatus according to claim 1, in which the apparatus comprises a first network access node and the capability information of the user equipment is received from the user equipment or from a second network access node from which the user equipment is handed over to the first network access node.

3. The apparatus according to claim 1, in which, for the case the received capability information indicates that the radio frequency layout of the user equipment is capable of simultaneous radio frequency chain operations across multiple component carriers but not independent radio frequency chain operation for each of individual ones of multiple component carriers, the at least one processor is configured with the memory and computer program code to cause the apparatus to configure the discontinuous reception monitoring pattern for each of the multiple component carriers that are configured for the user equipment by:
   assigning to the user equipment one discontinuous reception monitoring pattern for use across every one of the multiple component carriers configured for the user equipment.

4. The apparatus according to claim 1, in which, for the case the received capability information indicates that the user equipment is capable of simultaneous radio frequency chain operations across multiple component carriers and independent radio frequency chain operation for each of individual ones of multiple component carriers, the at least one processor is configured with the memory and computer program code to cause the apparatus to configure the discontinuous reception monitoring pattern for each of the multiple component carriers configured for the user equipment by:
   assigning to the user equipment a first discontinuous reception monitoring pattern for use in a first component carrier of the multiple component carriers that are configured for the user equipment; and
   assigning to the user equipment a second discontinuous reception monitoring pattern for use in a second component carrier of the multiple component carriers that are configured for the user equipment,
   in which the first and second discontinuous reception monitoring patterns are independent of one another.

5. The apparatus according to claim 4, in which the first and second component carriers are frequency non-contiguous with one another.

6. The apparatus according to claim 4, in which the first and second component carriers are frequency contiguous with one another and the configuring comprises configuring, based on the received capability information, at least one of monitoring patterns for measuring the respective component carriers and patterns for monitoring the respective component carriers for a resource allocation schedule.

7. A method comprising:
   receiving capability information of a user equipment indicating that a radio frequency layout of the user equipment is capable of at least one of simultaneous radio frequency chain operations across multiple component carriers and independent radio frequency chain operation for each of individual ones of multiple component carriers, in which the capability information comprises an indication of the radio frequency layout of the user equipment; and
   based on the received capability information, configuring at least a discontinuous reception monitoring pattern for each of the multiple component carriers that are configured for the user equipment.

8. The method according to claim 7, in which the method is executed by a first network access node and the capability information of the user equipment is received from the user equipment or from a second network access node from which the user equipment is handed over to the first network access node.

9. The method according to claim 7, in which, for the case the received capability information indicates that the user equipment is capable of simultaneous radio frequency chain operations across multiple component carriers but not independent radio frequency chain operation for each of individual ones of multiple component carriers, configuring the discontinuous reception monitoring pattern for each of the multiple component carriers that are configured for the user equipment comprises:

assigning to the user equipment one discontinuous reception monitoring pattern for use across every one of the multiple component carriers configured for the user equipment.

10. The method according to claim 7, in which, for the case the received capability information indicates that the user equipment is capable of simultaneous radio frequency chain operations across multiple component carriers and independent radio frequency chain operation for each of individual ones of multiple component carriers, configuring the discontinuous reception monitoring pattern for each of the multiple component carriers configured for the user equipment comprises:

assigning to the user equipment a first discontinuous reception monitoring pattern for use in a first component carrier of the multiple component carriers that are configured for the user equipment; and assigning to the user equipment a second discontinuous reception monitoring pattern for use in a second component carrier of the multiple component carriers that are configured for the user equipment, in which the first and second discontinuous reception monitoring patterns are independent of one another.

11. The method according to claim 10, in which the first and second component carriers are frequency non-contiguous with one another.

12. The method according to claim 10, in which the first and second component carriers are frequency contiguous with one another and the configuring comprises configuring, based on the received capability information, at least one of patterns for measuring the respective component carriers and patterns for monitoring the respective component carriers for a resource allocation schedule.

13. A non-transitory memory storing computer program instructions which when executed by a processor result in operations comprising:

receiving capability information of a user equipment indicating that a radio frequency layout of the user equipment is capable of at least one of simultaneous radio frequency chain operations across multiple component carriers and independent radio frequency chain operation for each of individual ones of multiple component carriers, in which the capability information comprises an indication of the radio frequency layout of the user equipment; and based on the received capability information, configuring at least a discontinuous reception monitoring pattern for each of the multiple component carriers that are configured for the user equipment.

14. The memory according to claim 13, in which the operations are performed by a first network access node and the capability information of the user equipment is received from the user equipment or from a second network access node from which the user equipment is handed over to the first network access node.

15. The memory according to claim 13, in which, for the case the received capability information indicates that the user equipment is capable of simultaneous radio frequency chain operations across multiple component carriers but not independent radio frequency chain operation for each of individual ones of multiple component carriers, the operations of configuring the discontinuous reception monitoring pattern for each of the multiple component carriers that are configured for the user equipment comprises:

assigning to the user equipment one discontinuous reception monitoring pattern for use across every one of the multiple component carriers configured for the user equipment.

16. The memory according to claim 13, in which, for the case the received capability information indicates that the user equipment is capable of simultaneous radio frequency chain operations across multiple component carriers and independent radio frequency chain operation for each of individual ones of multiple component carriers, the operations of configuring the discontinuous reception monitoring pattern for each of the multiple component carriers configured for the user equipment comprises:

assigning to the user equipment a first discontinuous reception monitoring pattern for use in a first component carrier of the multiple component carriers that are configured for the user equipment; and assigning to the user equipment a second discontinuous reception monitoring pattern for use in a second component carrier of the multiple component carriers that are configured for the user equipment, in which the first and second discontinuous reception monitoring patterns are independent of one another.

17. The memory according to claim 13, in which the configuring comprises configuring, based on the received capability information, one of: patterns for measuring the respective component carriers; and patterns for monitoring the respective component carriers for a resource allocation schedule.

\* \* \* \* \*